(12) United States Patent
Sprote et al.

(10) Patent No.: US 10,926,832 B2
(45) Date of Patent: Feb. 23, 2021

(54) GEARBOX

(71) Applicant: Move Bikes GmbH, Muhlhausen (DE)

(72) Inventors: Tobias Sprote, Muhlhausen (DE);
Marcus Rochlitzer, Muhlhausen (DE);
Stefan Schubert, Muhlhausen (DE);
Frederik Wassmann, Gottingen (DE);
Sixtus Godehard Feindt, Muhlhausen (DE)

(73) Assignee: Move Bikes GmbH, Muhlhausen (DE)

( * ) Notice: Subject to any disclaimer, the term of this patent is extended or adjusted under 35 U.S.C. 154(b) by 197 days.

(21) Appl. No.: 16/076,864

(22) PCT Filed: Feb. 10, 2017

(86) PCT No.: PCT/EP2017/053082
§ 371 (c)(1),
(2) Date: Aug. 9, 2018

(87) PCT Pub. No.: WO2017/137609
PCT Pub. Date: Aug. 17, 2017

(65) Prior Publication Data
US 2019/0039686 A1    Feb. 7, 2019

(30) Foreign Application Priority Data

Feb. 12, 2016 (DE) .................... 10 2016 001 660.4
Apr. 22, 2016 (DE) .................... 10 2016 004 888.3

(51) Int. Cl.
*B62M 3/06* (2006.01)
*B62M 9/08* (2006.01)
(Continued)

(52) U.S. Cl.
CPC ............... *B62M 3/06* (2013.01); *B62M 9/08* (2013.01); *B62M 11/02* (2013.01); *F16H 1/28* (2013.01);
(Continued)

(58) Field of Classification Search
CPC .......... B62M 3/06; B62M 9/08; B62M 11/02; F16H 1/28; F16H 35/00; F16H 55/30; F16H 2035/003
See application file for complete search history.

(56) References Cited

U.S. PATENT DOCUMENTS 4,125,239 A    11/1978  Berclaz et al.
5,261,294 A *  11/1993  Ticer ................. B62M 3/02
                                                280/260

(Continued)

OTHER PUBLICATIONS

International Search Report of the International Searching Authority for PCT/EP2017/053082 dated Aug. 16, 2017 (German).

(Continued)

*Primary Examiner* — Kevin Hurley
*Assistant Examiner* — Marlon A Arce
(74) *Attorney, Agent, or Firm* — Buchanan Ingersoll & Rooney PC (57) ABSTRACT

Disclosed is a gearbox having a central shaft (1), which is rotatably mounted relative to a stationary frame element (2) by means of at least one central shaft bearing (3), a first sun gear (4a) arranged concentrically around the central shaft (1) and fixedly secured to the frame element (2), a power transmission means (5) that is fixed in relation to the central shaft (1), and at least one first gearbox assembly (6a) rotating relative to the frame element (2) and comprising: a support plate (7), the first section (7a) of which is non-rotatably connected to the central shaft (1) and on the second section (7b) of which a planetary gear (8) is mounted by means of a planetary gear bearing (9), wherein the planetary gear (8) meshes with the first sun gear (4a) and a crank arm (10) engages rigidly with the planetary gear (8); and a driving crank (11), on which the crank arm (10) is hingedly mounted by means of a driving crank-crank arm bearing (12) and which is supported relative to the support plate (7)

(Continued)

by means of a kinematic coupling means (13). The aim of the invention was to provide a gearbox which has the most compact dimensions possible in the axial direction of the central shaft and in which the rotating driving crank (11) operates with as near to zero backlash as possible. According to the invention the aim is achieved by a gearbox in which the kinematic coupling means (13) is a swing arm (14).

12 Claims, 4 Drawing Sheets (51) Int. Cl.
*B62M 11/02* (2006.01)
*F16H 1/28* (2006.01)
*F16H 35/00* (2006.01)
*F16H 55/30* (2006.01)

(52) U.S. Cl.
CPC .............. *F16H 35/00* (2013.01); *F16H 55/30* (2013.01); *F16H 2035/003* (2013.01)

(56) References Cited

U.S. PATENT DOCUMENTS

| | | | |
|---|---|---|---|
| 6,802,798 B1 | 10/2004 | Zeng | |
| 7,404,785 B2* | 7/2008 | Stearns | A63B 21/068 482/52 |
| 2016/0319910 A1* | 11/2016 | Sevagen | F16H 1/2863 |
| 2017/0320538 A1* | 11/2017 | Sprote | B62M 11/145 |

OTHER PUBLICATIONS

Written Opinion of the International Searching Authority for PCT/EP2017/053082 dated Aug. 16, 2017 (German).
English Translation of International Preliminary Report on Patentability for PCT/EP2017/053082.

* cited by examiner

GEARBOX

The invention relates to a gearing system with the characteristics listed in the general description in claim 1.

Such gearing assemblies can be installed on bicycles, in particular, and increase the torque of the power generated by the rider. In this application, the housing of the gearing system is attached to part of the frame and the power transmission means, such as a ring gear, conveys the torque generated by the rider through a chain to the rear wheel. However, the gearing system according to the invention can also be used in wind power installations with vertical rotation axes.

DE29500144 U1 describes a drive assembly suited for bicycles in particular, which interacts on one side with one of the two pedal cranks and is intended to permit impulsion with no dead points and the same movement on both sides, each moved for only a half-period. This assembly has the disadvantage that the torque transmission and therefore the degree of efficiency are not much improved.

The prior art for this is described in DE10,2010/033211 B4, with a bicycle gearing system in which the sun gear, planet gear, and drive axle are all contained inside the same axle housing and the drive arm is supported by a guide roller in a guideway that is also contained in the drive housing. The drive axle is connected on two sides to a crank arm head of the crank arm and thereby receives any available pull-out torque. The guide roller, however, moves freely and with lateral play in the guideway, because otherwise the bearing unit of the crank arm head would be overstressed. A disadvantage of the known gearing system is that pedaling feels jerky due to the free-running guide roller, and in addition the known configuration with a load-bearing crank arm head on two sides leads to a high Q factor. The Q factor for a bicycle designates the lateral distance between the outer surfaces of the two pedal cranks. The higher the Q factor, the farther the pedals are from each other. This increases the risk of the pedal on the inside of a curve hitting the ground in tight curves when riding fast, and a too-high Q factor is unhealthy from an ergonomic standpoint. Even in other applications of the technology, it is desirable to be able to achieve a gear assembly configured as compactly as possible in the axial direction of the central shaft.

The invention is therefore intended to achieve the goal of providing a gearing system with the most compact dimensions possible in the axial direction of the central shaft and whose rotating drive crank moves with the least possible amount of play.

According to the invention this goal is achieved by the distinguishing features described in Claim 1. A swing arm is understood to be a rigid assembly, one end of which swings out from a central position in two directions relative to a support point. This results in the advantage that the use of a swivel-slide joint, which is kinematically optimal but susceptible to failure in operation, can be avoided and all of the bearings used can be configured as pivot bearings.

The gearing system according to the invention makes it possible to achieve maximum torque through the use of a power transmission in which a power-supplying element is guided synchronously in a uniform track. The power-supplying element can be the foot of a bicycle rider, for example. The uniformity results from both the continuous convex shape of the track and the reduction of absolute accelerations in the area of the power-supplying element. The ratio between the maximum and minimum absolute velocities does not exceed the value of 2.5 at any point in its movement.

The first and/or, if applicable, a second sun gear, together with the planet gear that interacts with it, preferably generates a transfer ratio of 1:2. A reasonable transfer ratio in principle and also in practice can alternatively be 1:4.

In the complete system of the gearing system according to the invention, the drive crank, preferably in a bearing axis of a pedal bearing P, serves as the main drive and the carrier plate as the secondary drive.

Advantageously, the first end of the swing arm is supported rotatably on the carrier plate by means of a swing arm carrier plate bearing, and its second end is supported rotatably on the drive crank by means of a swing arm drive-crank bearing. This means that the planet gear bearing, the drive-crank crank-arm bearing, the swing arm drive-crank bearing, and the swing arm carrier plate bearing form a four-bar linkage inside of the complete system, wherein the four-bar linkage in this case is driven by the continuously turning crank arm. The crank arm always has the shortest length in the four-bar linkage. The four-bar linkage is driven by the swing arm, which moves with an oscillating motion around the swing arm carrier plate bearing. The crank arm and swing arm are connected to each other by a coupling formed from a section of the drive crank between its drive-crank crank-arm bearing and the swing arm drive-crank bearing. Both the crank arm and the swing arm pivot on the carrier plate, with the crank arm connected rigidly to one shaft of the rotating planet gear. The swing arm drive-crank bearing, instead of the linear motion of a swivel-slide joint, simply has a linear motion similar to a circular orbit with a very large radius.

It has proven to be especially favorable for the crank arm and the swing arm to be located on the same side of the drive crank. The drive crank thereby lies on the outside of the gearing system in an axial direction from the central shaft, which allows for an exceptionally low Q factor. Advantageously, the crank arm and the swing arm are then also located in an axial direction from the central shaft, between the carrier plate and the drive crank.

Advantageously, under continuous rotation of the carrier plate, the swing arm covers a maximum swivel angle of 25-50° around the swing arm carrier plate bearing. The gearing system works especially efficiently at these maximum swivel angles.

Preferably, the swing arm carrier plate bearing is positioned on a center perpendicular placed vertically on a connecting line running between the bearing axes of the swing arm drive-crank bearing in its 0° and 90° positions. The two bearing axes, when in their end positions, thereby lie on a straight line that goes through the rotation axis of the gearing system. The four-bar linkage then represents a central crank rocker mechanism.

According to an especially advantageous embodiment, the swing arm carrier plate bearing and/or the drive-crank crank-arm bearing is/are positioned inside an outer periphery of the power transmission means. This allows for an exceptionally compact construction in the radial direction of the power transmission means, in which independently of the position of the drive crank—and regardless of it—no component extends beyond the power transmission means, so that, for example, conventional chain covers or other housings for the power transmission means can be used without the power transmission means colliding with them.

The distance between the swing arm carrier plate bearing and the swing arm drive-crank bearing can be greater than the distance between the swing arm drive-crank bearing and the drive-crank crank-arm bearing. The following conditions should also be met for a rotating gearing system:

g>d>c
d>b>c
s≠0 where g: distance between the bearing axis of the planet gear bearing ($A_O$) and the bearing axis of the swing arm carrier plate bearing ($B_O$).

where d: distance between the bearing axis of the swing arm carrier plate bearing ($B_O$) and the bearing axis of the swing arm drive-crank bearing (B, B').

where c: distance between the bearing axis of the planet gear bearing ($A_O$) and the bearing axis of the drive-crank crank-arm bearing (A).

where b: distance between the bearing axis of the drive-crank crank-arm bearing (A) and the bearing axis of the swing arm drive-crank bearing (B, B').

where s: length of the center perpendicular running through the bearing axis of the swing arm carrier plate bearing ($B_O$) placed vertically on a connecting line running between the bearing axes (B, B') of the swing arm drive-crank bearing in its 0° and 90° positions.

The term "bearing axis" is understood to mean the position of the rotational axis of each bearing, regardless of its dimensions or other structural properties.

Preferably, the swing arm carrier plate bearing, the swing arm drive-crank bearing, and the drive-crank crank-arm bearing always form a triangle.

Advantageously, the planet gear bearing and/or the drive-crank crank-arm bearing and/or the swing arm carrier plate bearing and/or the swing arm drive-crank bearing is/are each sealed separately against dirt and water spray. The aforementioned external bearings can be sealed by means of overlapping lip seals. The central shaft bearing(s) is/are preferably sealed by means of a cover plate (gap seal). This provides an effective seal. In addition, large housings can be avoided by the use of bellows, for example. They are susceptible to damage and also detrimental to the appearance of the gearing system.

Advantageously, the first sun gear is positioned on a first side of the frame element. This installation location corresponds to the conventional installation positions of the bottom brackets on a bicycle, for example.

It is particularly advantageous, especially when the gearing system according to the invention is used on a bicycle, if, on a second side that is opposite the first side with respect to the frame element, there is a second sun gear that interacts with a second gearing system that is rotating with respect to the frame element, wherein the second gearing assembly is offset by 180° from the first gearing assembly and includes a carrier plate, whose first section is connected rigidly to the central shaft and on whose second section a planet gear is supported by a planet gear bearing, the planet gear engages the second sun gear, and a crank arm rigidly engages the planet gear, as well as a drive crank, on which the crank arm is supported by means of a drive-crank crank-arm bearing that swivels and which is held against the carrier plate by a swing arm.

This results in a gearing system that has an outside sun gear and a symmetrical gearing assembly encircling the sun gear on each side of a centrally placed central shaft. The power transmission means positioned rigidly on the central shaft merely needs to be placed on one side of the frame element.

Preferably, the central shaft and/or the at least one central shaft bearing is/are placed concentrically inside the first and/or second sun gear. The advantage of this embodiment lies in the fact that the gearing system has especially compact dimensions in the axial direction of the central shaft.

The first and second sun gears can be manufactured in one piece. According to one preferred embodiment, the first and second sun gears are each configured as toothed wheels. In this case, one-piece manufacturing means that the toothed wheels of the first and second sun gears are fastened to each other by means of a hollow cylinder and normally the toothing of both toothed wheels, which are connected to each other, is generated in the same step of the machining process. This allows the teeth of the first sun gear to align as precisely as possible with the teeth of the second sun gear. The lower section of the frame element holding the toothed wheels that are connected to each other has an upper and a lower cover, which when assembled together have a shape that matches the hollow cylinder. During assembly, first the hollow cylinder is inserted into the upper cover and then the lower cover is connected to the upper cover, in particular with screws.

The hollow cylinder is essentially held in place by the upper and lower covers.

Advantageously, the power transmission means is a ring gear that preferably interacts or engages with a chain or gear belt. Alternatively, it is also possible to have a power transmission means in the form of a drive wheel that powers a belt, for example, without positive locking elements.

It is desirable for the ring gear to be attached to the carrier plate of the first and/or second gearing assembly. This gives the gearing system a compact construction in the axial direction of the central shaft, because an appropriate space is provided there anyway for the carrier plate and the ring gear is also placed at a distance from the nearest first side of the frame element that allows the chain to run freely.

For better comprehension, the invention is explained below based on four figures. The figures show.

Figure 1:
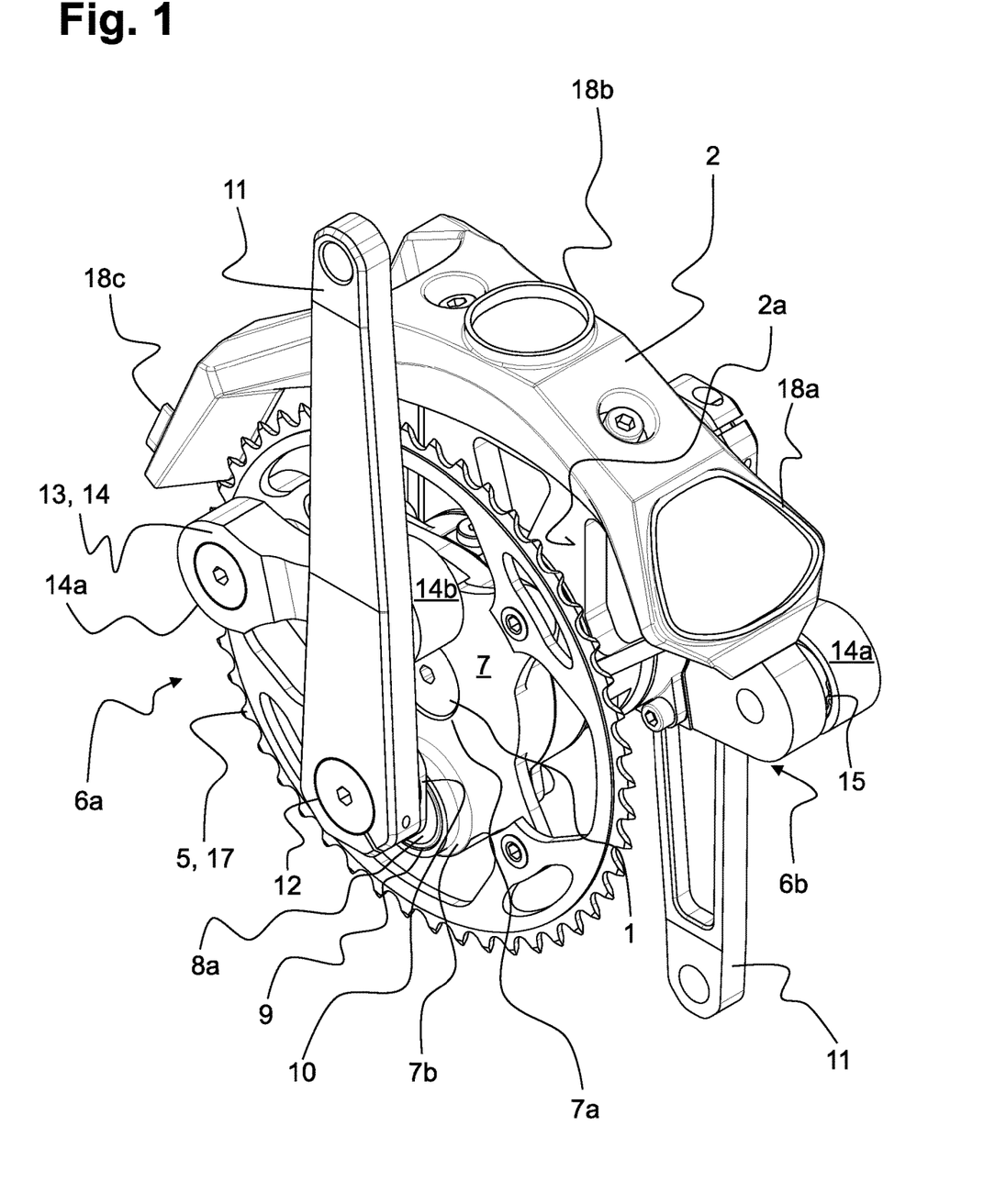
FIG. 1: a perspective view of the gearing system with drive cranks in the 0° position.

FIG. 1 shows a perspective view of the gearing system according to the invention, which can be connected by means of a frame element 2 to a bicycle frame, for example, which is not shown here. For this purpose, the frame element 2 has three mounting flanges 18*a*, 18*b*, 18*c* for mounting on a front pipe (mounting flange 18*a*), a saddle pipe (mounting flange 18*b*), and a rear pipe (mounting flange 18*c*).

On a first side 2*a* of the frame element 2 there is a first gearing assembly 6*a* and on the opposite second side 2*b* there is a second gearing assembly 6*b*. The second gearing assembly 6*b* located adjacent to the second side 2*b* lies behind the frame element 2 in the image plane and is mostly obscured by it.

The first and second gearing assemblies 6*a*, 6*b* relate to a central shaft 1, which runs crosswise through the frame element 2, with its front face visible. The central shaft 1 defines the rotational axis M of the gearing system (entire system) shown in FIG. 4.

The second gearing assembly 6b is positioned at 180° to the first gearing assembly, with reference to the rotation direction of the central shaft 1, so that a drive crank 11 of the first gearing assembly 6a extends upward and a drive crank 11 of the second gearing assembly 6b extends downward.

A carrier plate 7 is mounted on each axial end section of the central shaft 1 in such a way that it cannot twist, and it rotates in a circle together with the central shaft 1 when the gearing system is in operation. The connection between the carrier plate 7 and the central shaft 1 is made in a centrally located first section 7a of the carrier plate 7. In the radial direction of the carrier plate 7 there is an outer second section 7b with a planet gear 8 (see FIG. 4) that is held rotatably against the carrier plate 7 by means of a planet gear bearing 9. The planet gear bearing 9 engages with a cylinder-shaped shaft 8a of the planet gear 8.

On the outer end of the shaft 8a with respect to the frame element 2, a crank arm 10 is either attached rigidly or formed as a complete one-piece component. The crank arm 10 extends in a radial direction with respect to the shaft 8a and engages rotatably with the drive crank 11 by means of a drive-crank crank-arm bearing 12.

A kinematic coupler 13 in the form of a swing arm 14 is also connected rotatably to the carrier plate 7. A swing arm carrier plate bearing 15 between the carrier plate 7 and a first end 14a of the swing arm 14 is provided for this purpose, and can be seen especially well in FIG. 4. The second end 14b, positioned opposite the first end 14a, engages rotatably by means of a swing arm drive-crank bearing 16 on the side of the drive crank 11 related to the frame element 2 (see also FIG. 4)

The carrier plate 7 of the first gearing assembly 6a is completely encircled around its periphery by a power transmission means 5, consisting of a ring gear 17 in the represented embodiment of a bicycle gearing system. The ring gear 17 is thereby aligned concentrically with the central shaft 1.

Figure 2:
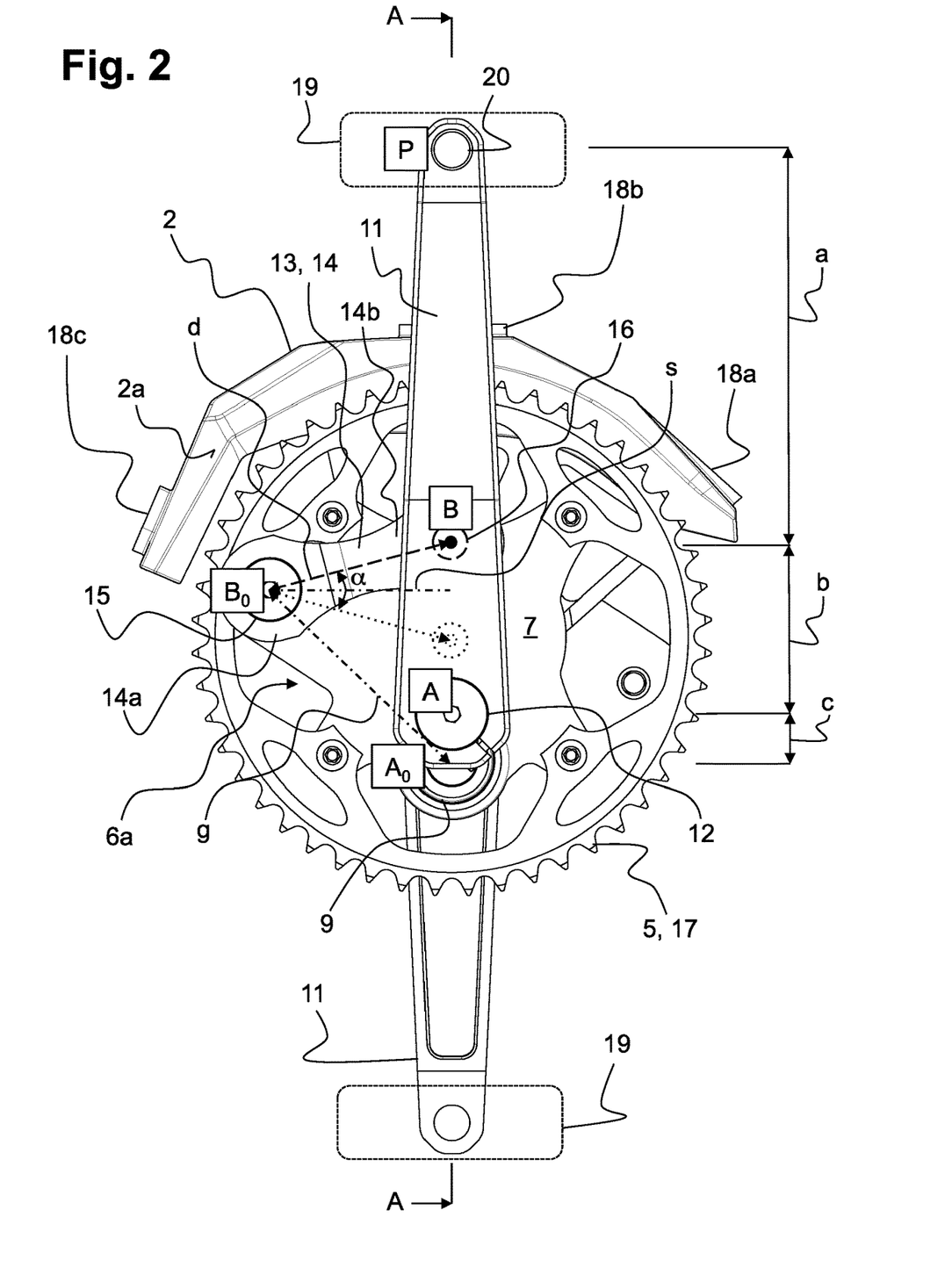
FIG. 2: a side view of the gearing system with drive cranks in the 0° position.
Figure 4:
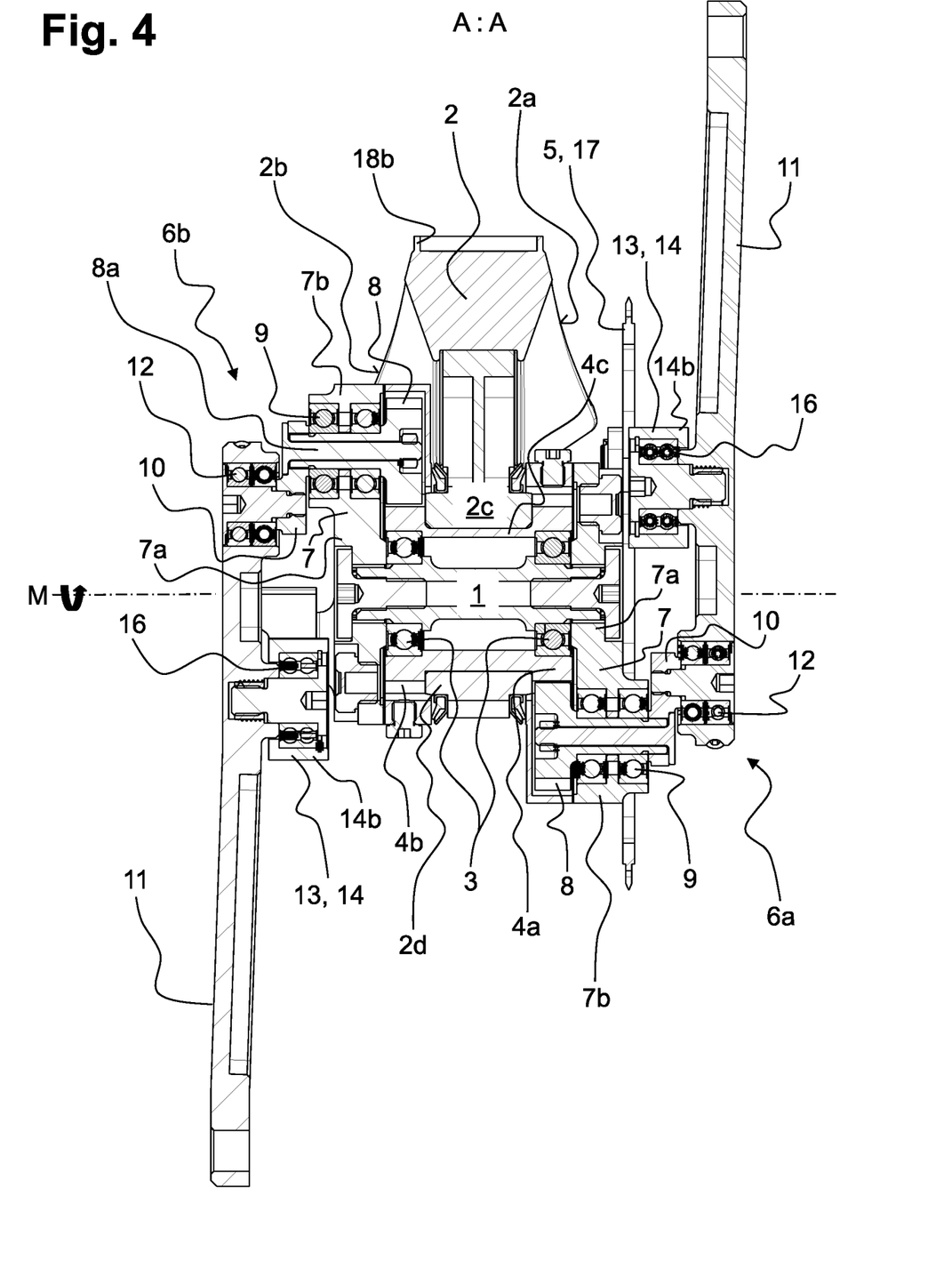
FIG. 4: a lengthwise section through the gearing system corresponding to cut plane A:A in FIG. 2.

Power is provided to the entire system by the two drive cranks 11 of the first and second gearing assemblies 6a, 6b, which form the outer limits of the gearing system in the axial direction of the central shaft 1. FIGS. 1, 2, and 4 show the drive cranks 11 and the gearing assemblies 6a, 6b related to each of them in a 0° position, in which the drive crank 11 and the related crank arm 10 are extended, meaning that the crank arm 10 is shown going out from the shaft 8a of the planet gear 8 radially inward towards the central shaft 1. This puts the free end of the drive crank 11 in its farthest outward position.

Figure 3:
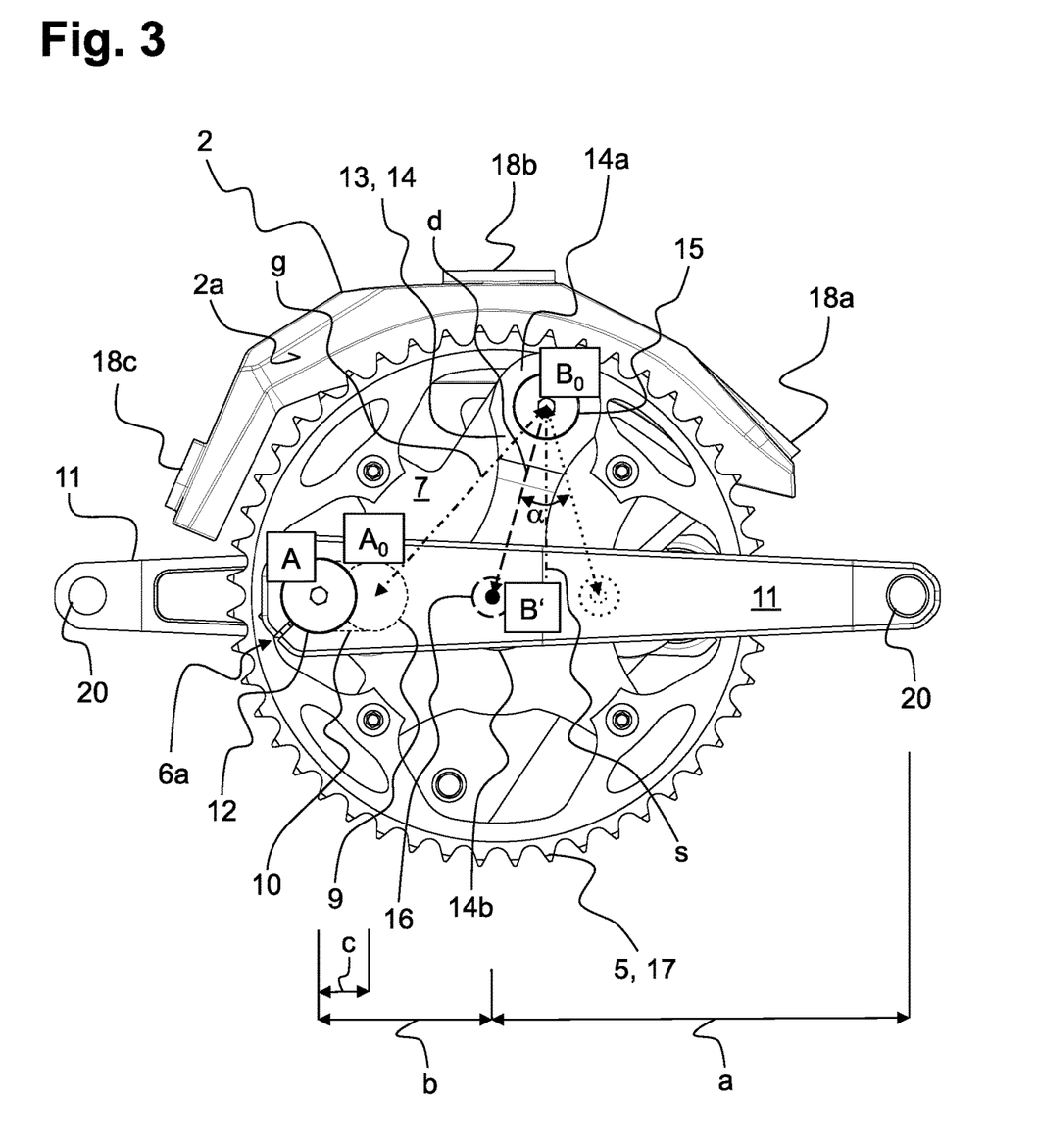
FIG. 3: a side view of the gearing system with drive cranks in the 90° position.

As can be seen in FIGS. 2 and 3, the 0° position (FIG. 2) and the 90° position (FIG. 3) of the drive cranks 11 are opposite each other in a side view of the gearing system, wherein for reasons of simplicity the drawing references and relationships are explained essentially based on the first gearing assembly 6a.

In FIG. 2, for example, a pedal 19 is fastened to each free end of the drive cranks 11, which is held rotatably against the related drive crank 11 by a pedal bearing 20. The pedal bearing 20 has a bearing axis P that is fixed with respect to the drive crank.

The swing arm 14 is attached at its first end 14a to the carrier plate 7 by the swing arm carrier plate bearing 15 and swings on a bearing axis 8a when the gearing system is rotating. The second end 14b of the swing arm 14 is attached rotatably to the drive crank 11 through the swing arm drive-crank bearing 16. The swing arm drive-crank bearing 16 has a bearing axis B, B', wherein the end position of the bearing axis B corresponds to the 0° position shown in FIG. 2 and the end position of the bearing axis B' to the 90° position shown in FIG. 3. The respective other end positions of the bearing axes B', B are achieved by changing the position of the drive crank 11 and indicated by a dotted line. The swing arm 14 covers a swing angle α, which is preferably between 25° and 50°, on the bearing axis $B_0$ between the end positions of the bearing axes B, B'.

The bearing axis P and bearing axes B, B' are located at a distance a from each other. The distance a is always constant, regardless of the position of the first or second gearing assembly 6a, 6b. In the case of a gearing system installed on a bicycle, the distance is preferably 100-200 mm, in particular 130-160 mm, and most preferably 145-155 mm.

The crank arm 10 is attached rotatably to the drive crank 11 and simultaneously to the planet gear bearing 9 by the drive-crank crank-arm bearing 12, wherein the drive-crank crank-arm bearing 12 has a bearing axis A that is fixed with respect to the drive crank 11 and the planet gear 9 has a bearing axis $A_0$ that is fixed with respect to the carrier plate 7. The shaft 8a of the planet gear 8 rotates around the bearing axis $A_0$.

The bearing axes B, B' and bearing axis A are located at a distance b from each other. The distance b is always constant, regardless of the position of the first and second gearing assembly 6a, 6b.

In the illustrated preferred embodiment of the gearing system, when maximum torque is achieved in the 90° position, the bearing axis B' is exactly at the rotational axis M (see FIG. 4) of the entire system. Moving the bearing axis B' in the direction of the bearing axis A generates negative torque in the 90° position, as seen in FIG. 3, which counteracts the proper rotation direction of the gearing system, for example, in the area of the central shaft 1 and is to be avoided as much as possible. Moving the bearing axis B' in the direction of the bearing axis P does indeed generate additional effective forward torque, but increases the installed dimensions of the gearing system. According to the invention, movement of the bearing axis B' on the rotational axis M in both directions should be less than 10% of the distance b.

Exactly between the bearing axis B (FIG. 2) and the bearing axis B' (FIG. 3), a center perpendicular s runs crosswise to the axial indication of the drive crank 11, and the bearing axis $B_0$ of the swing arm carrier plate bearing 15 is located on that center perpendicular. The center perpendicular s in principle has a value greater than 0, meaning that the bearing axis $B_0$ is always offset from the drive crank 11. This requires that there must also always be a distance d between the bearing axis B and the bearing axis $B_0$.

The two bearing axes A, $A_0$ are aligned at a distance c from each other, which is the same in the 0° position and in the 90° position. Obviously, the bearing axes $A_1$, $A_0$ extending from the 0° position as in FIG. 2 have reversed their position compared to the 90° position as in FIG. 3. This means that the drive crank 11 in the 0° position is in a pushed-out position with respect to the rotational axis M, in which distances a, b, c are added together. In the 90° position, however, the total of distances a, b, and c is reduced by distance c and the drive crank 11 is in a pulled-in position with respect to the rotational axis M (see FIG. 4).

The bearing axis $A_0$ is aligned with the bearing axis $B_0$ at a distance g, with is constant due to the fixed placements of the planet gear bearing 9 and the swing arm carrier plate bearing 15 on the carrier plate 7, regardless of the positions of the first and second gearing assemblies 6a, 6b. The distance g should be greater than the distance b, c, or d.

The lengthwise cut in FIG. 4 also shows the first and second sun gears 4a, 4b, which are fixed with respect to the frame element 2, wherein the first sun gear 4a is placed in the first side 2a of the frame element 2 and the second sun gear 4b is on the opposite second side 2b. The sun gear 4a is rigidly connected through a hollow cylinder 4c to the sun gear 4b, wherein the sun gears 4a, 4b and the hollow cylinder 4c are formed as a complete one-piece assembly. A complete one-piece assembly is understood to involve a connection that cannot be separated other than by destroying it. The first and second sun gears 4a, 4b are clamped onto the frame element 2 by the hollow cylinder 4c. For this purpose, the frame element 2 has an upper cover 2c whose shape at least partially matches the outer contour of the hollow cylinder 4c, which fits onto the hollow cylinder 4c from above in the image plane. From the other side, a lower cover 2d fits against the hollow cylinder 4c and is secured tightly to the upper cover 2c. The axial extension of the hollow cylinder 4c corresponds to the width of the upper and/or lower covers 2c, 2d, so that the first and second sun gear 4a, 4b is positioned exactly between them and held by its sides during operation.

The central shaft 1 runs concentrically inside the hollow cylinder 4c, and in the area of the first and second sun gears 4a, 4b it is attached to each of them by means of a central shaft bearing 3 that allows it to pivot. Due to the central shaft bearing 3 that is placed axially as far to the outside of the central shaft 1 as possible and coaxially inside of the first and second sun gears 4a, 4b, effective pull-out torques can be applied especially well to the central shaft 1.

LIST OF REFERENCE INDICATORS

1 Central shaft
2 Frame element
2a First side, frame element
2b Second side, frame element
2c Upper cover, frame element
2d Lower cover, frame element
3 Central shaft bearing
4a First sun gear
4b Second sun gear
4c Hollow cylinder
5 Power transmission means
6a First gearing assembly
6b Second gearing assembly
7 Carrier plate
7a First section, carrier plate
7b Second section, carrier plate
8 Planet gear
8a Planet gear shaft
9 Planet gear bearing
10 Crank arm
11 Drive crank
12 Drive-crank crank-arm bearing
13 Kinematic coupler
14 Swing arm
14a First end, swing arm
14b Second end, swing arm
15 Swing arm carrier plate bearing
16 Swing arm crank-arm bearing
17 Ring gear
18a Mounting flange, front pipe
18b Mounting flange, saddle pipe
18c Mounting flange, rear pipe
19 Pedal
20 Pedal bearing
α Swing arm swivel angle
$A_0$ Bearing axis, planet gear bearing
A Bearing axis, drive-crank crank-arm bearing
$B_0$ Bearing axis, swing arm carrier plate bearing
B' Bearing axis, swing arm drive-crank bearing, 0° position
B' Bearing axis, swing arm drive-crank bearing, 90° position
M Rotational axis, complete system
P Bearing axis, pedal bearing
a Distance $\overline{BP}$, $\overline{B'P}$
b Distance $\overline{AB}$, $\overline{AB'}$
c Distance $\overline{A_0 A}$
d Distance $\overline{B_0 B}$, $\overline{B_0 B'}$
g Distance $A_0 B_0$
s Center perpendicular

The invention claimed is:

1. A gearbox, comprising:
a central shaft, which is rotatably mounted relative to a stationary frame element by means of at least one central shaft bearing;
a first sun gear arranged concentrically around the central shaft and fixedly secured to the frame element;
a power transmission means that is fixed in relation to the central shaft; and
at least one first gearbox assembly rotating relative to the frame element comprising:
a support plate, the first section of which is non-rotatably connected to the central shaft and on the second section of which a planetary gear is mounted by means of a planetary gear bearing, wherein the planetary gear meshes with the first sun gear and a crank arm engages rigidly with the planetary gear; and
a drive crank, on which the crank arm is hingedly mounted by means of a drive crank-crank arm bearing and which is supported relative to the support plate by means of a kinematic coupling means,
wherein the kinematic coupling means is a pendulum arm, the pendulum arm having its first end rotatably mounted on the support plate by means of a pendulum arm support plate bearing and on its second end by means of a pendulum arm drive crank bearing rotatably mounted on the drive crank.

2. The gearbox according to claim 1, wherein the crank arm and the pendulum arm are arranged on a common side of the drive crank.

3. The gearbox according to claim 1, wherein during a complete rotation of the support plate of the pendulum arm the pendulum arm support plate bearing covers a maximum pivot angle of 25° to 50°.

4. The gearbox according to claim 1, wherein the pendulum arm support plate bearing assumes a position on a bisector perpendicular to a connecting line extending between the bearing axis of the pendulum arm drive crank bearing in its 0° and 90° position.

5. The gearbox according to claim 1, wherein the pendulum arm support plate bearing and/or the drive crank-crank arm bearing is arranged within an outer periphery of the power transmission means.

6. The gearbox according to claim 1, wherein a distance between the pendulum arm support plate bearing and the pendulum arm drive crank bearing is greater than a distance between the pendulum arm drive crank bearing and the drive crank arm bearing.

7. The gearbox according to claim 1, wherein the pendulum arm support plate bearing, the swing arm drive crank bearing and the drive crank arm bearing always span a triangle.

8. The gearbox according to claim 1, wherein at least one of the planetary gear bearing, the drive crank arm bearing, the pendulum arm support plate bearing and the pendulum arm drive crank bearings are each sealed separately.

9. The gearbox according to claim 1, wherein the first sun gear is arranged on a first side of the frame element.

10. A gearbox, comprising:
a central shaft, which is rotatable mounted relative to a stationary frame element by means of at least one central shaft bearing, the stationary frame element having a first side;
a first sun gear arranged concentrically around the central shaft, and fixedly secured to the frame element the first sun gear being arranged on a first side of the frame element;
a power transmission means that is fixed in relation to the central shaft; and
at least one first gearbox assembly rotating relative to the frame element comprising:
a support plate, the first section of which is non-rotatably connected to the central shaft and on the second section of which a planetary gear is mounted by means of a planetary gear bearing, wherein the planetary gear meshes with the first sun gear and a crank arm engages rigidly with the planetary gear;
a drive crank, on which the crank arm is hingedly mounted by means of a drive crank-crank arm bearing and which is supported relative to the support plate by means of a kinematic coupling means,
wherein the kinematic coupling means is a pendulum arm, the pendulum arm having its first end rotatably mounted on the support plate by means of a pendulum arm support plate bearing and on its second end by means of a pendulum arm drive crank bearing rotatably mounted on the drive crank; and
a second sun gear provided on a side opposite to the frame element of the first side, which cooperates with the frame member rotating second gear assembly, wherein the second gear assembly is offset by 180° to the first gear assembly and a support plate;
wherein the first portion is rotatably connected to the central shaft, and at the second portion a planetary gear by means of a planetary gear bearing the planetary gear meshes with second sun gear is rigidly mounted, by a crank arm; and
wherein a drive crank is attached to the crank arm by means of a drive crank-crank arm bearing rotatably mounted via a pendulum arm against the support plate.

11. The gearbox according to claim 10, wherein the first and second sun gear are monolithically produced.

12. A gearbox, comprising:
a central shaft, which is rotatably mounted relative to a stationary frame element by means of at least one central shaft bearing,
a first sun gear arranged concentrically around the central shaft and integral with the frame element,
a power transmission means fixed to the central shaft, and
at least one gearbox assembly rotating relative to the frame element the gearbox assembly comprising:
a support plate whose first portion is rotatably connected to the central shaft and is mounted at the second portion to a planetary gear by means of a planetary gear bearing, wherein the first sun gear meshes with the planetary gear and rigidly engages a crank arm, and
a drive crank to which the crank arm is attached by means of a drive crank bearing, the crank arm bearing pivotally mounted and supported via a kinematic coupling means relative to the support plate,
wherein the kinematic coupling means is a pendulum arm, the pendulum arm having its first end rotatably mounted on the support plate by means of a pendulum arm support plate bearing and on its second end by means of a pendulum arm drive crank bearing rotatably mounted on the drive crank.

\* \* \* \* \*